Oct. 13, 1964 H. E. SWEENEY 3,153,189

ATTENUATION NETWORK AUTOMATICALLY CONTROLLED BY LEVEL OF SIGNAL CARRIER

Filed Feb. 15, 1961 3 Sheets-Sheet 1

WITNESSES:

Bernard R. Gieguez

James F. Young

INVENTOR
Harold E. Sweeney

BY

ATTORNEY

Oct. 13, 1964 H. E. SWEENEY 3,153,189

ATTENUATION NETWORK AUTOMATICALLY CONTROLLED BY LEVEL OF SIGNAL CARRIER

Filed Feb. 15, 1961 3 Sheets-Sheet 2

3,153,189
ATTENUATION NETWORK AUTOMATICALLY CONTROLLED BY LEVEL OF SIGNAL CARRIER

Harold E. Sweeney, Menlo Park, Calif., assignor to Westinghouse Electric Corporation, East Pittsburgh, Pa., a corporation of Pennsylvania Filed Feb. 15, 1961, Ser. No. 89,493
3 Claims. (Cl. 323—66)

This invention relates to alternating current attenuation networks and, in particular, to a bridged-T network using asymmetric impedance semiconductor elements.

Many electronic systems require control of the amplitude of an alternating current wave by means of a control potential or current. In some prior art television and radio receivers automatic gain control has been accomplished by application of a control potential to the grids of remote cutoff tubes in the RF and IF signal channels. In transistor radio receivers various circuits have been used to provide control of the amplification factor of the intermediate frequency stages in response to a control voltage, but all such systems for transistor amplifiers have been complex and expensive and most of them have had other inherent limitations. In addition to the difficulty of providing automatic gain control in transistor circuits, such circuits have the further disadvantage that they tend to produce excessive distortion when driven by an input signal of excessive amplitude. Thus, a transistor radio in close proximity to a transmitting station will produce distortion because of over-excitation of the input stage.

It is therefore the principal object of the present invention to provide an improved passive network for alternating current signal amplitude control.

It is another object of the present invention to provide an alternating current signal translating network which can be automatically adjusted to exhibit a continuously variable attenuation factor.

It is a further object of the present invention to provide an improved alternating current wave translating network having a constant image impedance and a variable attenuation factor in which the attenuation factor is controllable by means of an auxiliary control potential.

In addition to the aforementioned advantageous applications of the present invention, there are a number of areas in the field of alternating current circuits which lend themselves to the application of bridge type networks. The term bridge network is intended to include all networks which have a substantially constant image impedance and which have either a variable attenuation factor at all frequencies or which provide for substantial attenuation at a particular frequency without attenuating other adjacent frequency bands. For example, paragraph 7 of Section 13 of Terman's Radio Engineers' Handbook, 1st Edition, McGraw-Hill Book Company, New York, describes the use of such a network for measuring the inductance and Q of radio frequency coils. The same handbook at paragraph 26 of Section 3 describes the use of substantially resistive networks for controllably reducing voltage, current, or power in alternating current transmission paths. The usefulness of all such networks has been limited by the difficulty of providing adjustment of the rejection frequency and the attenuation factor. Thus, the Terman adjustable frequency network can be adjusted to give a null at any impressed frequency, but to change from one frequency to another requires manual readjustment of at least two network elements with both such elements comprising relatively expensive structures. Likewise, the attenuation networks described by Terman at Section 3 generally require the simultaneous and coordinated manual adjustment of two or three variable impedance members The foregoing requirement of manual adjustment of variable reactances or resistances has heretofore precluded the use of such networks for remote control or for servo operation in response to a control potential.

Accordingly, it is a further object of the present invention to provide a network of the bridged-T type in which the attenuation may be varied by altering a single control voltage.

It is a different object of the present invention to provide such a network having a substantially constant image impedance for all values of attenuation factor.

It is a still further object of the present invention to provide a radio wave receiver having improved ability to handle a wide range of input signal amplitudes without distortion and without substantial variation of output signal in which receiver a network of the type described is used for automatically controlling the receiver gain.

The attainment of these objects and others will be realized from the following specification, taken in conjunction with the drawing, throughout which like reference characters indicate like parts, which drawing forms a part of this application and in which.

Figure 2:
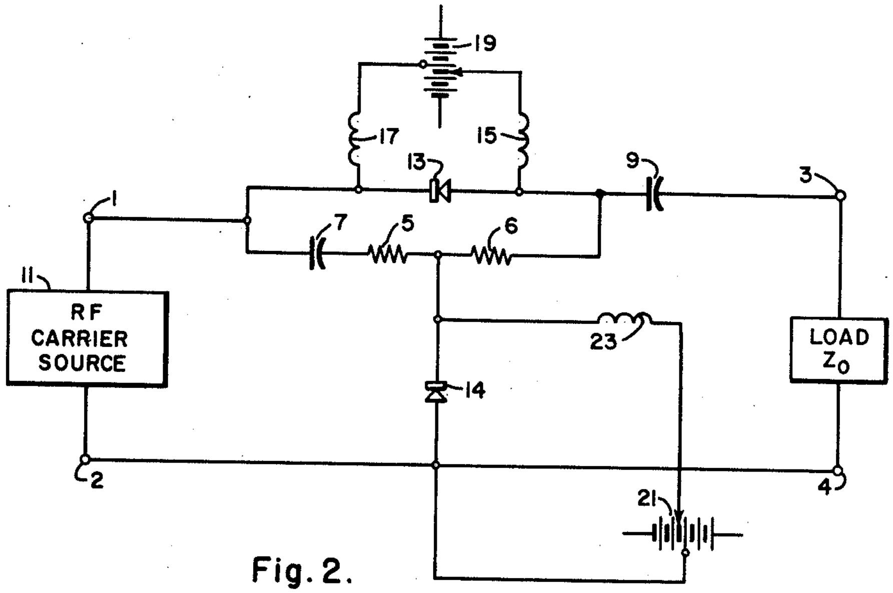
FIG. 2 illustrates the basic electrical network of the present invention.

A specific network embodying the present invention is shown in FIG. 2. The network shown belongs to the general class of circuits set forth by the above-mentioned Terman handbook at pages 215 and 216. Such bridged-T networks are commonly used when it is desired that the presence of the attenuator network in the alternating current signal channel shall have relatively little effect upon the impedance relations existing in the signal channel. This is commonly achieved by making the image impedance of the attenuator network substantially equal to either or both the signal source impedance and the input impedance of the system which is fed by the attenuator.

Referring in detail to FIG. 2, the network comprises a pair of input terminals 1, 2, and a pair of output terminals 3, 4, supplying a load $Z_0$. The load $Z_0$ is intended to represent diagrammatically the input impedance of a transmission line, amplifier or other similar system element which might be coupled ot receive alternating current from the network. The first input terminal 1 is connected to the first output terminal 3 by a pair of resistors 5 and 6 connected in a series combination with D.C. blocking capacitors 7 and 9 between the terminals 1 and 3. The resistors 5 and 6 preferably are of equal resistance values and are each equal to the characteristic impedance $Z_0$ of the load. The capacitors 7 and 9, in accordance with the preferred embodiment have capacitances large enough to provide substantially no impedance to alternating current at the frequency of the source 11. The terminals 1, 3 are also connected by an asymmetric impedance semiconductor diode 13 having a resistance $R_3$ at the frequency $f$ of the alternating voltage impressed on the terminals 1, 2. The semiconductor diode 13 is in effect shunted across the series combination of the resistors 5 and 6 and provides a direct alternating current path between the first input terminal 1 and the first output terminal 3. The midterminal or junction point between the resistors 5 and 6 is connected to the upper end or cathode of a second semiconductor diode 14 having a resistance $R_4$. Diode 14 is generally similar to the first semiconductor diode 13. The anode of diode 14 is conductively connected to the commonly connected second input terminal 2 and second output terminal 4.

A variable direct current source 19, shown schematically as a battery, has one terminal connected through an RF choke 17 to the cathode of the semiconductor diode 13 and has its other terminal connected through an RF choke 15 to the anode of diode 13. In a similar manner, bias potential is applied to the second semiconductor diode 14 from a second variable direct current voltage source 21 which has one terminal connected directly to the anode of diode 14 and has the other terminal connected through a choke 23 to the cathode of diode 14. It will be appreciated by those skilled in the art that the radio frequency chokes 15, 17 and 23 permit insertion of D.C. control potential or low frequency control signals to the diodes 13 and 14 while blocking the flow of RF energy from the network towards the direct current sources 19 and 21.

It is readily apparent that if diode 13 is forwardly biased so that it is highly conductive, its resistance to alternating currents of relatively small amplitude will be practically negligible. If at the same time, the second diode 14 is reverse biased to cutoff then signals from the RF carrier source 11 will be transmitted through the diode 13 without attenuation, and the effectively open circuit condition of diode 14 will prevent dissipation of RF energy in resistors 5 and 6.. Conversely, if diode 14 is forwardly biased so as to be highly conductive and the diode 13 is reverse biased to cutoff, then the entire voltage of source 11 appears across resistor 5 and substantially no signal is applied to the output terminals 3 and 4. Under this latter circumstance the attenuation factor of the network approaches infinity. The attenuation factor of the network can be varied from a minimum which is close to zero to a maximum which approaches infinity by simultaneously and inversely varying the control potentials applied from the sources 19 and 21 to the diodes 13 and 14. It will be apparent from the following that the voltage-current characteristics of the semiconductor diodes, and the dynamic impedances thereof are continuous functions of the applied bias potential. Accordingly, the variation of the network attenuation factor from zero toward infinity is a smooth variable without discontinuities.

Figure 1:
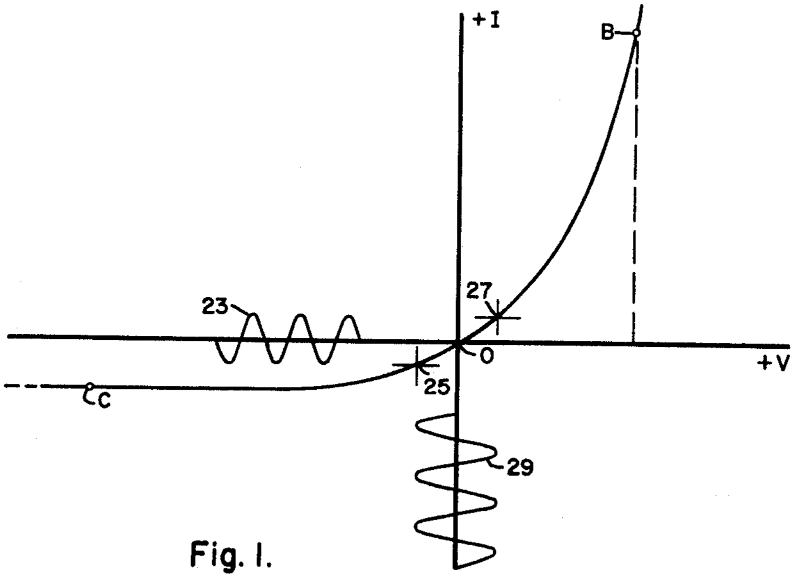
FIGURE 1 illustrates the voltage current characteristic of a typical asymmetric impedance semiconductor element of the type used in the present invention.

Referring to FIG. 1 there is illustrated the voltage current characteristic of a typical asymmetric impedance semiconductor element or p-n junction diode which may be used in the present invention. If this semiconductor diode is unbiased so that its operating point is at the origin point O it will have an intermediate impedance value corresponding to the slope of the voltage current characteristic at the origin. If an alternating current signal 29 applied to such a diode has a peak-to-peak amplitude which is small compared to the permissible voltage range of operation of the diode, then the dynamic resistance which the diode presents to that alternating current wave will correspond to the average slope of the characteristic curves between the points 25 and 27. Now, if the same diode is biased to an operating point B, as shown in FIG. 1, the dynamic resistance presented by the diode will be very substantially reduced and will have a value corresponding to the slope of the characteristic curve at point B. Similarly, it is readily apparent that if the diode is biased to place the operating point at the point C when any small change in voltage, either positive or negative, will have substantially no change on the current, indicating that the dynamic resistance at the point C is extremely high and for practical purposes may be considered as approaching infinity. Stated vigorously, the dynamic resistance is equal to the first derivative of the equation which defines the current as a function of voltage.

At paragraph 3.6 of Section 3 of the handbook of Semiconductor Electronics, 1st Edition (1956), by Lloyd P. Hunter, McGraw-Hill Book Company, New York, there is derived and defined the classical equation for the voltage-current relation of a p-n junction:

$$I=I_0(e^{uV}-1) \qquad \text{(I)}$$

The above equation holds for either p-n junctions or metal-semiconductor junctions such as found in point contact diodes and transistors. For p-n junctions, the constant $u$ in the equation is equal to $$\frac{q}{kT}$$

where $q$ is the charge of the electron, $1.6\times10^{-19}$ coulombs; $k$ is Boltzmann's constant, $1.38\times10^{-23}$; and T is the absolute temperature in degrees Kelvin. In the equation $I_0$ is a constant approximately equal to the maximum saturation current which the particular semiconductor junction will conduct in the reverse direction, and hence is the amplitude constant of the diode equation. I is the instantaneous forward or reverse current which flows in the semiconductor diode in response to an instantaneous forward or reverse voltage V and $e$ is the base of Napierian logarithms.

In accordance with the present invention it is preferred to use p-n junction elements as the variable impedance components 13 and 14 of FIG. 2. For junction type semiconductor diodes of good quality, the constant $u$ in Equation I closely approximates the theoretical predicted value of $$\frac{q}{kT}$$

For point contact or metal-semiconductor contact rectifiers, the constant $u$ is usually substantially smaller than the theoretical value and may be of the order of ⅓ to ½ of $$\frac{q}{kT}$$

For a forwardly biased diode, for example biased to the operating point B of FIG. 1, the dynamic conductance of the diode is the first derivative of the current. That is, forwardly biased diode 13 has a current:

$$i=I_0(e^{qV/kT}-1) \qquad \text{(II)}$$

and its conductance is:

$$G_3=\frac{1}{R_3}=\frac{di}{dV}=\frac{I_0q}{kT}e^{qV/kT} \qquad \text{(III)}$$

Similarly, a reversed biased diode, for example biased to the point C of FIG. 1, has a reverse current:

$$i=I_0(1-e^{-qV/k})$$

and the dynamic conductance is:

$$G_4=\frac{1}{R_4}=\frac{di}{dV}=\frac{I_0q}{kT}e^{-qV/kT} \qquad \text{(IV)}$$

From the classical network theory as set forth by the Terman handbook at pages 215-217 it is known that a bridged-T network, to present a constant image impedance, should have the impedance relation:

$$Z_3Z_4=Z_0^2 \qquad \text{(V)}$$

where $Z_3$ and $Z_4$ are the impedances of the diode elements 13 and 14.

Thus, to provide a constant image impedance $Z_0$ at input terminals 1, 2 and output terminals 3, 4 the FIG. 2 network must be arranged so that:

$$Z_0^2=Z_3Z_4=R_3R_4$$

or $$\frac{1}{Z_0^2}=G_3G_4 \qquad \text{(VI)}$$

substituting values from Equations III and IV into Equation VI the product of the conductances of oppositely biased diodes 13, 14 is:

$$\frac{1}{Z_0^2}=G_3G_4=\frac{I_0^2q^2}{k^2T^2} \qquad \text{(VII)}$$

and is seen to be independent of the bias potentiol applied to either diode so long as the diodes are within the forward and reverse bias ranges where their characteristics conform to the theoretical diode equation.

Since Equation VII is independent of voltage it may be adapted to a bridged-T attenuator such as FIG. 2 by making:

$$Z_0=\frac{kT}{Z_0q}=\frac{1}{\sqrt{G_3O_4}}$$

For any given temperature $k$, $q$ and T are constant; however, $I_0$ is variable as a function of the effective area of the P-N junction and a junction area satisfactory for any given desired value of $Z_0$ can be designed. For example, if a 50 ohm transmission line is to be the load at terminals 3, 4 then:

$$Z_0=50$$

$$I_0=\frac{kT}{Z_0q}=\frac{300\times 1.38\times 10^{-23}}{50\times 1.6\times 10^{-19}}=518\times 10^{-6}\text{ amperes}$$

It happens that the above value for $I_0$ is substantially the same as the reverse saturation current found in presently commercial P-N junction diodes such as the 1N90 or 1N95 as manufactured, for example, by Raytheon Manufacturing Corporation of Waltham, Massachusetts.

It is readily apparent that when good quality, high inverse voltage P-N junction elements are used in the circuit of FIG. 2 the useful biasing range (where the diode law is followed) is greater than the range from point B to point C of FIG. 1. Therefore, the peak-to-peak A.C. voltage applied to the attenuator from source 11 may be at least as large as one-tenth the permissible biasing range B–C, and such input voltage will still be as large as the maximum RF and IF voltages normally encountered in radio wave receivers and the like. The fact that practical RF signal amplitudes to be translated are small compared to the useful range of the curve of FIG. 1, means that the dynamic impedances presented to the RF signal by diode elements 13 and 14 can be varied over a wide range without distortion of the signal waveform and without objectionable production of harmonic components.

Figure 4:
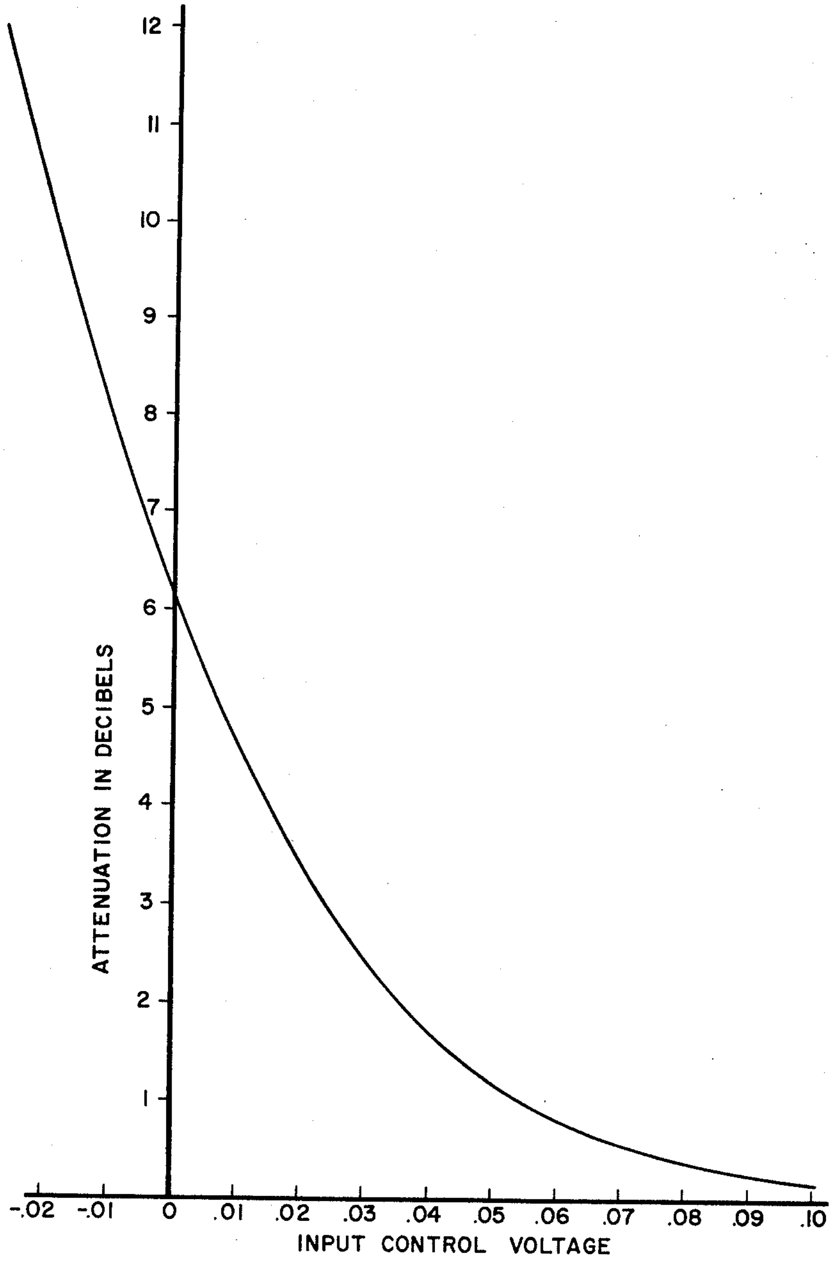
FIG. 4 is a graph of the attenuation of the network of FIG. 3 plotted as a function of control potential.

Variations in the dynamic resistances $R_3$ and $R_4$ of the diode elements 13 and 14 as functions of input D.C. control potential are shown in the following table, and attenuation as a function of control voltage is illustrated by FIG. 4.

*Table I*

| Attenuation In Decibels | Bridge Arm $R_{13}$, Dynamic Resistance | Bias Voltage Across $R_{13}$ | Shunt Arm $R_{14}$, Dynamic Resistance | Input Control Voltage |
|---|---|---|---|---|
| 0.0 | 0.005 | 0.24 | 5 x $10^5$ | 0.24 |
| 0.2 | 1.16 | 0.098 | 2,150 | 0.098 |
| 0.4 | 2.36 | .079 | 1,061 | 0.079 |
| 0.6 | 3.58 | .069 | 699 | 0.069 |
| 0.8 | 4.82 | .061 | 518 | 0.061 |
| 1.0 | 6.10 | .055 | 410 | .055 |
| 2.0 | 12.95 | .036 | 193 | .036 |
| 3.0 | 20.6 | .024 | 121 | .024 |
| 4.0 | 29.2 | .015 | 85.5 | .015 |
| 5.0 | 38.9 | .007 | 64.2 | .007 |
| 6.0 | 49.8 | .0011 | 50.2 | .001 |
| 8.0 | 75.6 | −.0098 | 33.1 | −.0098 |
| 10.0 | 108 | −.019 | 23.1 | −.019 |

Figure 3:
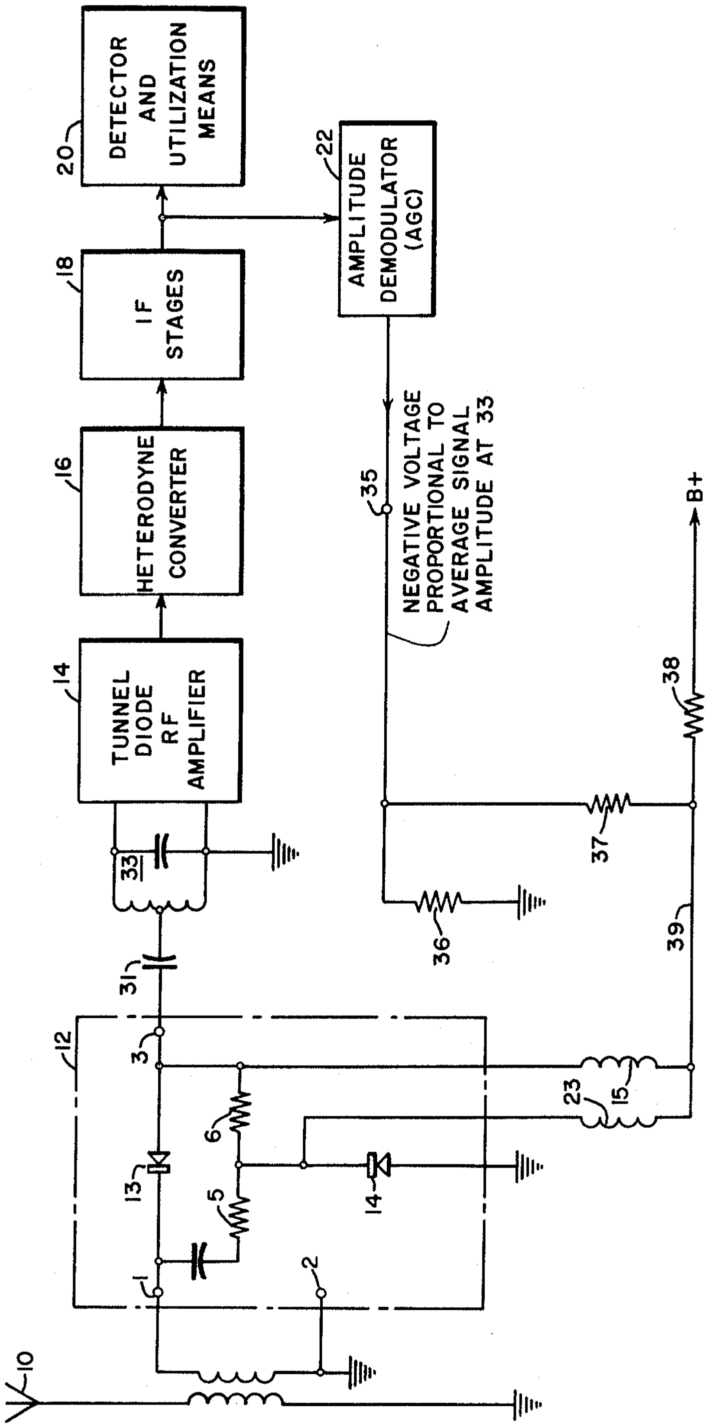
FIG. 3 illustrates a radio frequency wave receiver which utilizes the present invention in a manner to accomplish automatic radio wave amplitude control.

In FIG. 3 there is shown a complete radio wave receiver system using a bridged-T attenuator 12, generally similar to that described heretofore, to provide for automatic signal amplitude control. While the radio wave receiver shown by FIG. 3 might be a tube type receiver or a transistor radio or television receiver, it is shown generally as including one or more tunnel diode amplifier stages. The signal amplitude control system of the present invention has particular advantage in connection with tunnel diode amplifiers because of the fact that no economical and effective methods are presently known for controlling the gain of a tunnel diode amplifier. Thus, in receivers utilizing tunnel diode amplifiers, arrangements other than direct gain control are necessary for signal amplitude control. The present invention provides one system which may be used in receivers employing tunnel diode amplifiers.

In accordance with conventional practice, radio waves are received by antenna 10 and a carrier wave subject to undesired fading and other random amplitude variations is applied to the terminals 1, 2. As set forth heretofore in connection with FIG. 2, the radio carrier is translated by thet network 12 and reproduced at terminal 3 in a partially attenuated or reduced amplitude form. The degree of attenuation may vary from a fraction of one decibel to as high as several hundred decibels depending on the control voltage applied through RF chokes 15 and 23. The carrier signal output from attenuator 12 is applied through a coupling capacitor 31 to the input tank circuit 33 of a tunnel diode RF amplifier 14. The output signal from amplifier 14 is processed, in conventional fashion, by converter 16, one or more intermediate frequency amplifier stages 18 and is applied to a detector and signal utilization means 20. The utilization means 20 may comprise a loud speaker for sound reception or picture display apparatus in the case of television or radar signal reception. In addition to being applied to the utilization means 20, the output signal from the last IF stage 18 is applied to an amplitude demodulator 22 and an integrated control potential is produced at conductor 35, which potential may be used as an error signal for indicating variation of the carrier signal amplitude from a predetermined desired carrier amplitude.

Preferably, in accordance with the present invention, the voltage at conductor 35 is a negative voltage generally proportional to the average signal amplitude at output terminal 3. A voltage divider comprising serially connected resistors 36, 37 and 38 is provided to alter the direct current level of the signal at conductor 35. The voltage divider 36–38 is shown merely as an example of one known means for shifting the absolute level of a slowly varying control potential. Obviously, other known arrangements might be used alternatively for providing at conductor 39 a control potential which varies both positively and negatively with respect to ground. It is to be understood that the voltage at conductor 39 will have a negative value with respect to ground when the output signal from IF amplifier 18 is excessive, and will have a positive value with respect to ground when the output carrier signal amplitude at amplifier 18 is normal or smaller than normal. Assuming for the moment a negative voltage at conductor 39, that potential is applied by way of choke 23 to the cathode of diode 14 thereby biasing it in the forward direction and reducing its dynamic impedance. Similarly, the control potential from conductor 39 is applied through choke 15 to the anode of diode element 13 thereby biasing it in the reverse direction and substantially increasing its impedance. The differential changes in the impedances of the diodes 13 and 14 are mutually reciprocal thereby conforming to the rules of linear network theory for maintaining a constant image impedance, and the increased impedance of diode 13 accompanied by the decreased impedance of diode 14 results in an incremental change in the attenuation factor of the network in accordance with the curve of FIG. 4. Thus, the circuit arrangement including the radio frequency signal channels 14, 16, 18 of the receiver, the amplitude demodulator 22 and the attenuator network 12 constitute a servomechanism loop for stabilizing the radio frequency carrier signal amplitude at terminal 3. Of course, manual means for adjusting the stabilized signal amplitude may be provided by making one or more of the resistors 36, 37 and 38 manually variable.

There has been described a circuit arrangement including a novel attenuator network useful to improve the radio frequency signal handling capacity of transistor radio and television receivers as well as other radio frequency signal translating circuits. In a broader sense, the present invention has application to any circumstances where it is desired to vary or control the attenuation or amplification of an alternating current wave by means of a direct current or low frequency control potential. The invention has particular importance as a satisfactory method for providing automatic gain control in radio receivers incorporating tunnel diode amplifiers.

If it appears desirable in any particular system that the attenuation be made dependent upon the alternating current signal frequency such effect may be obtained within the scope of the present invention by using network component elements which are reactive as well as being resistive. For example, to obtain certain frequency response effects it is known that the resistors 5 and 6 of FIG. 2 may be replaced with capacitors or other reactive elements. Further, it may be observed that the p-n junction diode elements 13 and 14 inherently have a substantial capacitance which is variable as a function of reverse bias potential applied to the diodes. Such capacitance variation may be desirably utilized in some applications for variable control of the attenuation factor-frequency characteristics of the network 12.

Further, it is contemplated as being within the scope of the present invention that the diodes 13, 14, the resistors 5 and 6 and the capacitors 7 and 9 as well as other possible components need not be physically individual circuit components of the conventional type, but rather one or more elements, such as the diodes 13 and 14, may be constructed from solid state materials in accordance with molecular electronics concepts to provide a monolithic solid state unit. Such units may be formed generally in accordance with the structural techniques taught by copending application Serial No. 64,854, filed October 25, 1960, by John B. Husher et al. and assigned to the same assignee as the present invention.

While the present invention has been shown in certain preferred embodiments only, it will be obvious to those skilled in the art that it is not so limited, but is susceptible of various changes and modifications without departing from the spirit and scope thereof.

I claim as my invention:

1. A radio frequency receiving channel for receiving and utilizing a radio frequency carrier modulated with intelligence signals, said channel including a signal attenuator having first and second input terminals and first and second output terminals, a pair of substantially equal impedances having a junction therebetween connected in series between said first terminals, a connection between said second terminals, first and second semiconductor diodes whose dynamic impedances vary as functions of biasing potential applied thereto, said first diode being coupled between said first terminals, said second diode being coupled between the junction between said pair of substantially equal impedances and said connection, means deriving a direct current automatic gain control signal representative of the carrier amplitude, and means responsive to said signal to simultaneously oppositely vary bias on said first and second semiconductor diodes.

2. A radio frequency receiving channel for receiving and utilizing a radio frequency carrier modulated with intelligence signals, said channel including an automatic gain control circuit having first and second input terminals and first and second output terminals, a pair of substantially equal impedances having a junction therebetween connected in series between said first terminals, a connection between said second terminals, first and second semiconductor diodes whose dynamic impedances vary as functions of biasing potential applied thereto, said first diode being coupled between said first terminals, said second diode being coupled between the junction between said pair of substantially equal impedances and said connection, said diodes poled alike with respect to said first input terminal, means deriving a direct current automatic gain control signal representative of the carrier amplitude, and means responsive to said signal to simultaneously oppositely vary the bias on said first and second semiconductor diodes.

3. A radio frequency receiving channel for receiving and utilizing a radio frequency carrier modulated with intelligence signals, an automatic gain control circuit in said channel to effectively attenuate received radio frequency carrier signal including first and second input terminals and first and second output terminals, a pair of substantially equal impedances having a junction therebetween connected in series between said first terminals, a connection between said second terminals, first and second semiconductor diodes whose dynamic impedance vary as functions of biasing potential applied thereto, said first diode being coupled between said first terminals, said second diode being coupled between the junction between said pair of substantially equal impedances and said connection, said diodes being similarly poled with respect to said first input terminal means deriving a direct current automatic gain control signal representative of the carrier amplitude, and means responsive to said automatic gain control signal to simultaneously oppositely vary bias on said first and second semiconductor diodes in accordance with the amplitude of said automatic gain control signal.

References Cited in the file of this patent

UNITED STATES PATENTS

| | | |
|---|---|---|
| 2,021,920 | Norwine | Nov. 26, 1935 |
| 2,811,695 | Drexler | Oct. 29, 1957 |
| 2,951,980 | Jones | Sept. 6, 1960 |
| 2,971,164 | Saari | Feb. 7, 1961 |

FOREIGN PATENTS

| | | |
|---|---|---|
| 413,383 | Great Britain | July 19, 1934 |